UNITED STATES PATENT OFFICE.

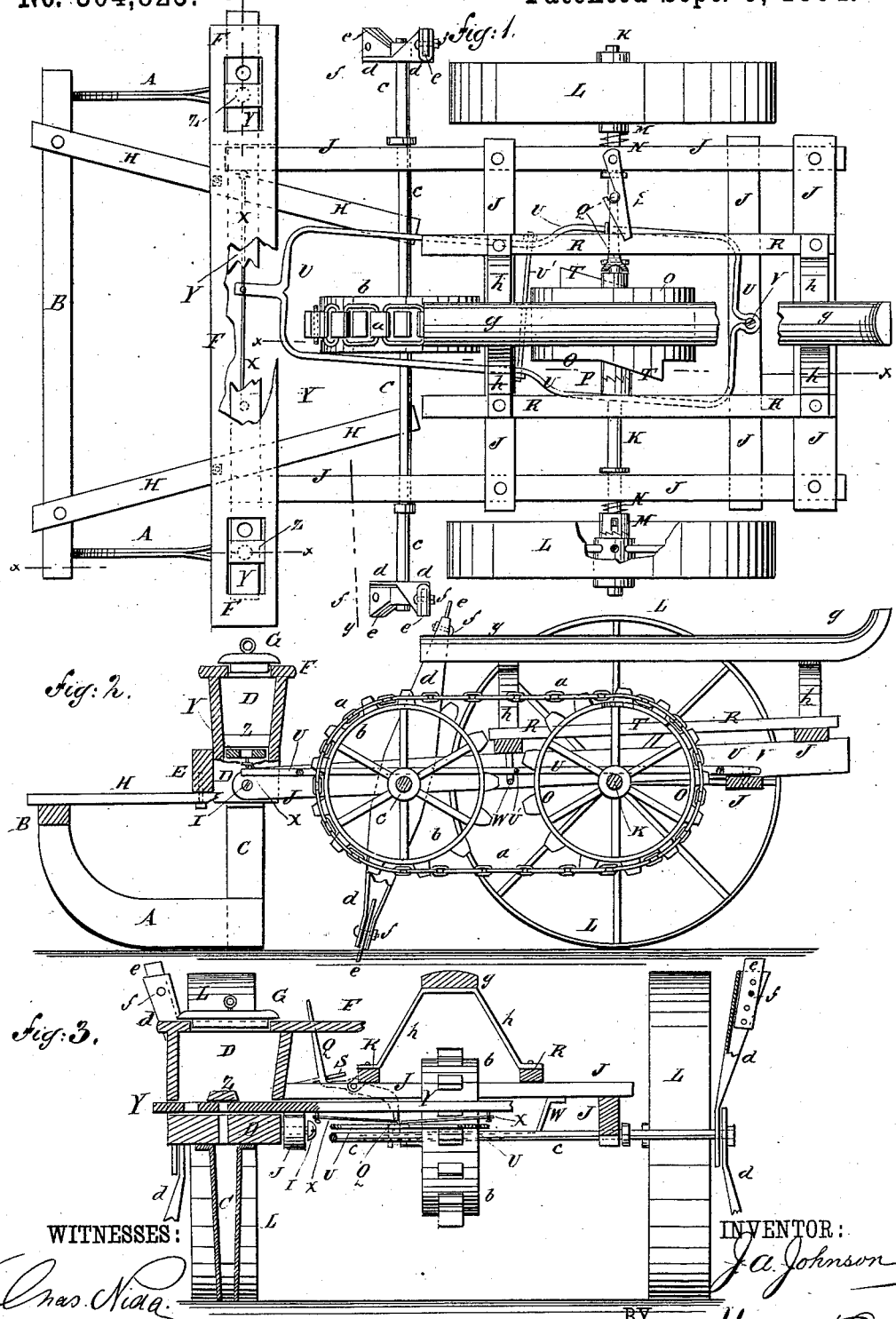

JOHN A. JOHNSON, OF LONDON MILLS, ILLINOIS.

SELF-DROPPING CORN-PLANTER.

SPECIFICATION forming part of Letters Patent No. 304,825, dated September 9, 1884.

Application filed April 17, 1884. (No model.)

*To all whom it may concern:*

Be it known that I, JOHN ALBERT JOHNSON, of London Mills, in the county of Fulton and State of Illinois, have invented certain new and useful Improvements in Self-Dropping Corn-Planters, of which the following is a full, clear, and exact description.

Reference is to be had to the accompanying drawings, forming part of this specification, in which similar letters of reference indicate corresponding parts in all the figures.

Figure 1 is a plan view of my improvement, parts being broken away. Fig. 2 is a sectional side elevation of the same, taken through the broken line $x$ $x$, Fig. 1. Fig. 3 is a sectional front elevation of the same, taken through the line $y$ $y$, Fig. 1.

The object of this invention is to facilitate the planting of corn in accurate check-row, and to promote convenience in operating and controlling corn-planters.

The invention consists in the construction and combination of parts, as will be hereinafter fully described and claimed.

The seed-dropping slide is connected with the axle of the drive-wheels by a wheel placed upon the said axle, and provided with cams operating upon a vibrating frame, pivoted at one end to the carriage-frame, and connected at the other end by a wire or rod attached to the said seed-dropping slide, so that the said slide will be operated by the revolution of the said axle. The cam-wheel is placed loose upon the axle, is connected therewith by a fixed clutch, and is provided with a lever for throwing it into and out of gear with the said axle. Around the cam-wheel is passed an endless chain, which also passes around a chain-wheel attached to a shaft carrying cross-arm markers, so that the ground will be marked in line with the hills. The marker cross-arms are provided with adjustable points, so that the ground can be marked deeper or shallower. To the planter-frame are attached levers, which project beneath the marker-shaft, connected with the carriage-frame, whereby the runners can be raised from the ground by tilting the said carriage-frame, as will be hereinafter fully described.

A are the runners that open channels in the soil to receive the seed, and which are connected at their forward ends by a cross-bar, B.

To the rear ends of the runners A are attached the lower ends of the hollow standards C, which serve as spouts to conduct the seed to the ground, and which are attached at their upper ends to the bottoms of the seed-boxes D.

To the forward edges of the bottoms of the seed-boxes D is attached a cross-bar, E, and to the tops of the said seed-boxes D is attached a cross-board, F, which has openings formed in its end parts, through which the seed is poured into the said seed-boxes D, the said openings being closed by covers G. The planter-frame is further strengthened by the braces H, the forward ends of which are attached to the end parts of the cross-bar B. The braces H, converging inwardly are attached at their middle parts to the cross-bar E, and their inner ends project beneath the marker-shaft, (hereinafter described,) to adapt them to serve as levers to raise the runners A from the ground when the rear end of the carriage-frame is tilted downward in the manner hereinafter described.

To the inner edges of the bottoms of the seed-boxes D are hinged, by screws I or other suitable means, the forward ends of the side bars of the carriage-frame J, to which side bars, a little in the rear of their centers, are attached bearings for the axle K of the drive-wheels L. The drive-wheels L are made with wide rims, to adapt them to serve as rollers to press the soil down upon and cover the seed.

Upon the inner ends of the hubs of the drive-wheels L are formed clutch-teeth, to engage with the sliding clutches M, placed upon the axle K, connected with the said axle by pins and slots, or other suitable means, and held outward by spiral or other springs, N, placed upon the said axle and interposed between the said clutches M and the bearings of the axle K on the side bars of the carriage-frame J, so that one of the wheels L can revolve slower than the other in turning and in planting curved rows without affecting the operation of the mechanism connected with and operated from the said axle. Upon the middle part of the axle K is placed a wheel, O, upon one end of the hub of which are formed clutch-teeth, to engage with a clutch, P, fixed to the axle K, so that the said axle K will carry the said wheel O with it in its revolution. Upon the other end of the hub of the wheel O is formed an annular groove, to receive the forked lower end of the bent lever Q, which is fulcrumed to a support attached to one of the longitudinal bars R, secured to cross-bars of the carriage-frame J, to serve as foot-rests for the driver. With this construction the wheel O can be thrown out of and into gear with the axle K by operating the lever Q. The lever Q is locked in place when holding the wheel O in gear with the axle K by a hook, S, pivoted to a side bar of the frame J, and which engages with the said lever.

Upon the opposite edges of the opposite parts of the rim of the wheel O are formed inclined projections or cams, T, which engage successively with the side bars of the frame U, so that the said frame will be vibrated by the revolution of the said wheel. The side bars of the frame U, in front of the wheel O, are connected by a bolt or rod, U', having a head on one end and a nut upon the other end, so that the said side bars can be drawn toward each other, or allowed to spring apart by adjusting the said bolt, to cause the said frame U to throw the seed-dropping bar with more or less force, as may be desired. The rear end of the frame U is pivoted by a bolt or screw, V, or other suitable means, to a cross-bar of the carriage-frame J. The frame U is supported by a long keeper, W, attached to a forward cross-bar of the frame J.

To the forward end of the frame U is attached the middle part of a wire, X, a rod or other suitable connection, the ends of which are attached to the seed-dropping slide Y. The ends of the seed-dropping slide Y pass through the seed-boxes D, just above their bottoms, and have holes formed in them to receive seed from the said seed-boxes, and drop it through holes in the seed-box bottoms into the hollow standards C, through which it falls to the ground. The slide Y is kept from carrying out any more seed than enough to fill its apertures by cut-offs Z, beneath which it passes, and which cut-offs are attached to the seed-boxes D, directly over the discharge-apertures in the bottoms of the said seed-boxes. By this construction the seed will be dropped twice for each revolution of the drive-wheels L, and the hills will be at a uniform distance apart equal to half the circumference of the said drive-wheels.

Upon the rim of the wheel O are formed teeth or projections to adapt it to serve as a chain-wheel, and around it passes the endless chain a, which also passes around a chain-wheel, b, attached to the shaft c. The shaft c revolves in bearings attached to the side bars of the frame J, and to its ends are attached cross-arms d, the ends of which are slotted or grooved to receive the bars e, which serve as points to mark the ground. The points e are secured to the ends of the cross-arms d by bolts f, and several holes are formed in the said points to receive the fastening-bolts, so that the said points can be readily adjusted to make deeper or shallower marks and to take up the wear.

In the drawings the markers are represented as striking the ground in the rear of the cross-rows; but in practice the said markers should be arranged to strike the ground in line with the cross-rows, and at the same time that the seed is dropped.

g is the driver's seat, which is made long, is placed longitudinally with the machine, and is attached to supports h, secured to the cross-bars of the carriage-frame J, so that the driver can move forward upon the seat to throw his weight upon the runners to cause them to enter the soil deeper or cause them to mark hard soil, or so that he can move back upon the said seat to cause his weight to tilt the carriage-frame J and raise the runners from the ground for convenience in turning around and in passing from place to place.

In using the machine, when the opposite side of the field is reached the wheel O is thrown out of gear, stopping the seed-dropping and the marking mechanisms. The runners A are then raised from the ground, the planter is turned, and the wheel O is turned by the driver with his foot, so that the marker-points e will strike the ground in line with the hills last planted. The wheel O is then thrown into gear, and the machine is driven across the field.

In case the marker-points e should not strike the ground in line with the dropped seed and at the time the seed is dropped, the endless chain a is taken off the marker-wheel b and the said wheel is turned until the marker-points come into the right position, when the endless chain a is again put on, and the machine is ready for use.

Having thus fully described my invention, I claim as new and desire to secure by Letters Patent—

1. In a corn-planter, the combination, with the axle K and the seed-dropping slide Y, of the wheel O, having cams T on its opposite sides, the vibrating frame U, extending around said cam-wheel, and the connections X, connecting the frame with the dropping-slide, substantially as herein shown and described, whereby the said seed-dropping slide will be operated by the revolution of the said axle, as set forth.

2. In a corn-planter, the combination, with the axle K and the loose cam-wheel O, adapted to slide thereon, of the fixed clutch P, also on said shaft, and the lever Q, for sliding the cam-wheel, and a latch for locking the lever, substantially as herein shown and described, whereby the said wheel can be readily thrown into and out of gear with the said axle, as set forth.

3. In a corn-planter, the combination, with the planter-frame B E, the marker-shaft c, and the carriage-frame J, of the levers H, and the rounded seat g, extending from the wheel b to the rear cross-bar J, substantially as herein shown and described, whereby the runners can be raised from the ground by the driver sliding forward on the seat for tilting the said carriage-frame, as set forth.

JOHN A. JOHNSON.

Witnesses:
 C. J. TRUMBULL,
 WALTER RIST.